United States Patent
Gandhi

(10) Patent No.: US 8,152,466 B2
(45) Date of Patent: Apr. 10, 2012

(54) CENTRIFUGAL FORCE ACTUATED VARIABLE SPAN HELICOPTER ROTOR

(75) Inventor: Farhan Gandhi, State College, PA (US)

(73) Assignee: Agustawestland North America, Inc., Reston, VA (US)

( * ) Notice: Subject to any disclaimer, the term of this patent is extended or adjusted under 35 U.S.C. 154(b) by 402 days.

(21) Appl. No.: 12/432,409

(22) Filed: Apr. 29, 2009

(65) Prior Publication Data
US 2009/0290981 A1   Nov. 26, 2009

Related U.S. Application Data

(60) Provisional application No. 61/048,975, filed on Apr. 30, 2008.

(51) Int. Cl.
*B64C 27/72* (2006.01)
(52) U.S. Cl. .......................................................... 416/88
(58) Field of Classification Search ................. 416/20 A, 416/24, 88
See application file for complete search history.

(56) References Cited

U.S. PATENT DOCUMENTS

| | | | |
|---|---|---|---|
| 3,884,594 A * | 5/1975 | Fradenburgh | 416/87 |
| 6,019,578 A * | 2/2000 | Hager et al. | 416/88 |
| 6,923,622 B1 * | 8/2005 | Dehlsen | 416/87 |

* cited by examiner

*Primary Examiner* — Chandra Chaudhari
(74) *Attorney, Agent, or Firm* — MH2 Technology Law Group, LLP

(57) ABSTRACT

A variable diameter helicopter rotor and method of using are disclosed. The variable diameter helicopter rotor includes a rotor hub operable by helicopter controls at variable revolutions per minute, and a linearly extensible rotor blade connected to the rotor hub, a linear span of the rotor blade only adjustable in response to an amount of centrifugal force generated in the rotor blade by a rotational speed of the rotor hub, an operational rotor blade to effect at least lift of the helicopter. The linearly extensible rotor blade can include telescoping inner and outer sections, and a restrictive force device positioned between the inner and outer sections. The variable diameter helicopter rotor can be used by adjusting a linear span of rotor blades connected to the rotor hub by an amount corresponding to an amount of centrifugal force generated in the rotor blades by a rotational speed of the rotor hub.

24 Claims, 10 Drawing Sheets

CENTRIFUGAL FORCE ACTUATED VARIABLE SPAN HELICOPTER ROTOR

CROSS-REFERENCE TO RELATED APPLICATIONS

This application claims priority from Provisional Patent Application Ser. No. 61/048,975, filed Apr. 30, 2008, which is herein incorporated by reference in its entirety.

FIELD

This invention relates generally to rotor blades and, more particularly to helicopter rotor or tilt rotor blades with a variable span.

BACKGROUND

Helicopters are unique in that their performance, including that of flight, depends on a length of each rotor blade provided on a rotor hub. For example, with heavy lifting, a long rotor blade works best, whereas short rotor blades are desirable for reducing drag and for achieving higher maximum speeds, especially in a compound or coaxial configuration.

In part because of the need for differing performance requirements within a single aircraft at diverse flight conditions, there has long been interest in providing helicopter rotor blades with variable lengths. Altering the diameter of a rotor changes a number of characteristics including blade tip speed, effective lift, landing capabilities, stealth, aircraft speed, reduction in radar profile, fuel efficiency, and more.

There have been attempts to provide helicopter rotors wherein the length of each blade may be adjusted. Most recently, advances in the variable diameter rotor concept have been initiated by Sikorsky Aircraft.

A variable diameter rotor 100 as offered by Sikorsky is illustrated in FIG. 1, by way of example. The rotor 100 has an outward appearance similar to that of a conventional helicopter rotor, but blades 110 thereof telescope in length during flight to increase or decrease rotor disk area. A complex system 120 of differential gears, extension and retraction brakes, and jackscrews are used to extend and retract the rotor blades 110. A majority of the components are provided in a hub (not shown) of the rotor 100, with the jackscrews, for example, housed in the rotor blade 110.

There is recognition in the field of helicopter rotors, that the known system (including differential gears, extension and retraction brakes, jackscrews and the like) used to achieve the desired extension and retraction of helicopter rotor blades is also most subject to failure. Specifically, upon operation of the rotor, the rotor blades encounter huge centrifugal forces, requiring large actuators to retract the rotor blades during flight. The force required to counter the centrifugal force creates friction in the system, and the mechanical components therefore tend to jam because of the extreme friction. Because centrifugal force has previously been believed to be a deterrent to the functioning of variable diameter blades, there has been no recognition to utilize generated centrifugal force as a component of a variable diameter rotor.

Adjustable length blades are known for various other devices. However, these devices cannot be looked to for guidance for various reasons. For example, in a wind turbine, it has been practiced to provide a movable blade section attached to a fixed blade section. In some cases, extended blades are utilized to increase drag in higher wind conditions and in other cases, the extended blades can be used to increase power output. It will be appreciated though, that in all wind turbines, the blade rotation translates wind power into energy, and there is no direct rotation of the turbine blades by an internal power source of the wind turbine. In fact, providing an internal power source to rotate wind turbine blades would be contrary to a function of wind turbines, at the outset. Accordingly, a length of the wind turbine blades is not a function of internal power supplied by the wind turbine, nor rotation of a hub supporting the blades. Instead, wind turbine power is derived from the wind and more specifically rotation of the blades by the wind.

In another device, such as a ceiling fan, it is known to use rotation of a fan hub to pivot a fan blade from a folded position to a fanning position. However, it has not been recognized to linearly extend a length of the fan blade as a result of the fan hub rotation, or to control a length of the fan blade as a result of a rotational speed of the fan hub.

Accordingly, there remains a need for helicopter rotors with variable diameter rotor blades, which will overcome the known deficiencies described.

BRIEF SUMMARY

These and other problems are generally solved or circumvented, and technical advantages are generally achieved, by preferred exemplary embodiments herein which disclose structure of a variable diameter rotor. The exemplary embodiments herein overcome the deficiencies of known variable diameter rotors, and describe a simple yet effective variable span helicopter rotor. The exemplary rotor utilizes the previously damaging centrifugal force as an actuator for varying a span of the blade. More specifically, the rotor blade length is variable in response to an amount of centrifugal force generated in the rotor blade by a rotational speed of a rotor hub.

A variable diameter helicopter rotor is disclosed.

The exemplary variable diameter helicopter rotor includes a rotor hub operable by helicopter controls at variable revolutions per minute (RPM); and a linearly extensible rotor blade connected to the rotor hub, a linear span of the rotor blade adjustable in response to an amount of centrifugal force generated in the rotor blade by a rotational speed of the rotor hub, an operational rotor blade to effect at least lift of the helicopter. The linearly extensible rotor blade includes an inner blade section; an outer blade section telescopically slidable with respect to the inner blade section; and a restrictive force device (such as a spring) between the inner blade section and outer blade section.

A method of using a variable diameter helicopter rotor is disclosed.

The exemplary method includes generating rotation of a rotor hub; and adjusting a linear span of rotor blades connected to the rotor hub by an amount corresponding to an amount of centrifugal force generated in the rotor blades by a rotational speed of the rotor hub, an operational rotor blade effecting at least lift of the helicopter.

Additional embodiments of the disclosure will be set forth in part in the description which follows, and in part will be obvious from the description, or may be learned by practice of the present disclosure. The embodiments of the disclosure will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The invention is best understood from the following detailed description when read with the accompanying FIG- URES. It will be appreciated that various features may not be drawn to scale. In fact, the dimensions of various features may be arbitrarily increased or reduced for clarity of discussion. Reference is now made to the following descriptions taken in conjunction with the accompanying drawings, in which.

DETAILED DESCRIPTION

In the following description, reference is made to the accompanying drawings that form a part thereof, and in which is shown by way of illustration specific exemplary embodiments which may be practiced. Wherever possible, the same reference numbers will be used throughout the drawings to refer to the same or like parts. These embodiments are described in sufficient detail to enable those skilled in the art to practice the embodiments and it is to be understood that other embodiments may be utilized and that changes may be made without departing from the scope of the invention. The following description is, therefore, merely exemplary.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

Figure 1:
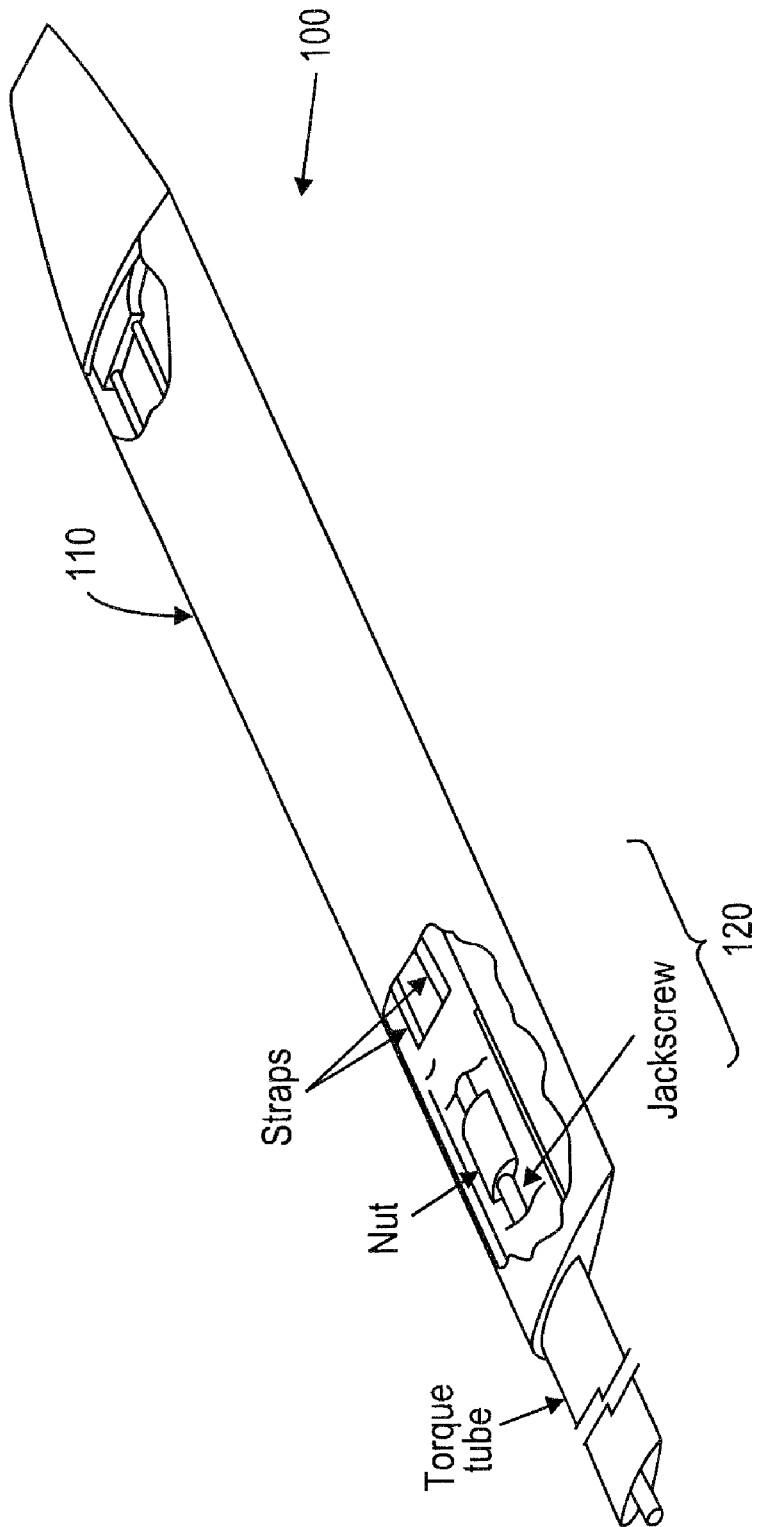
FIG. 1 is a perspective view of a prior art design for a variable length helicopter rotor blade.
Figure 2A:
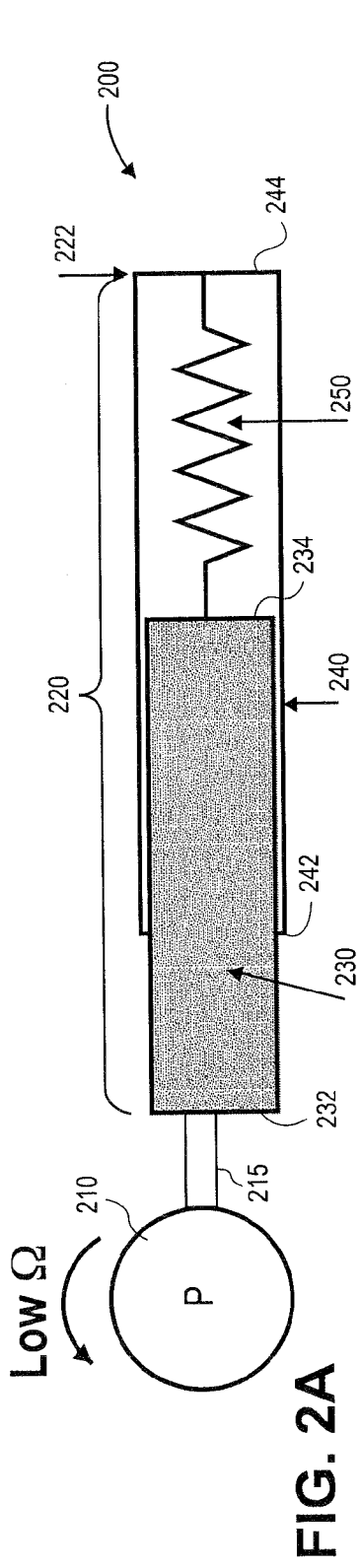
FIGS. 2A and 2B depict exemplary conceptual operations of a variable length helicopter rotor blade according to certain embodiments in two extension positions, respectively.
Figure 2B:
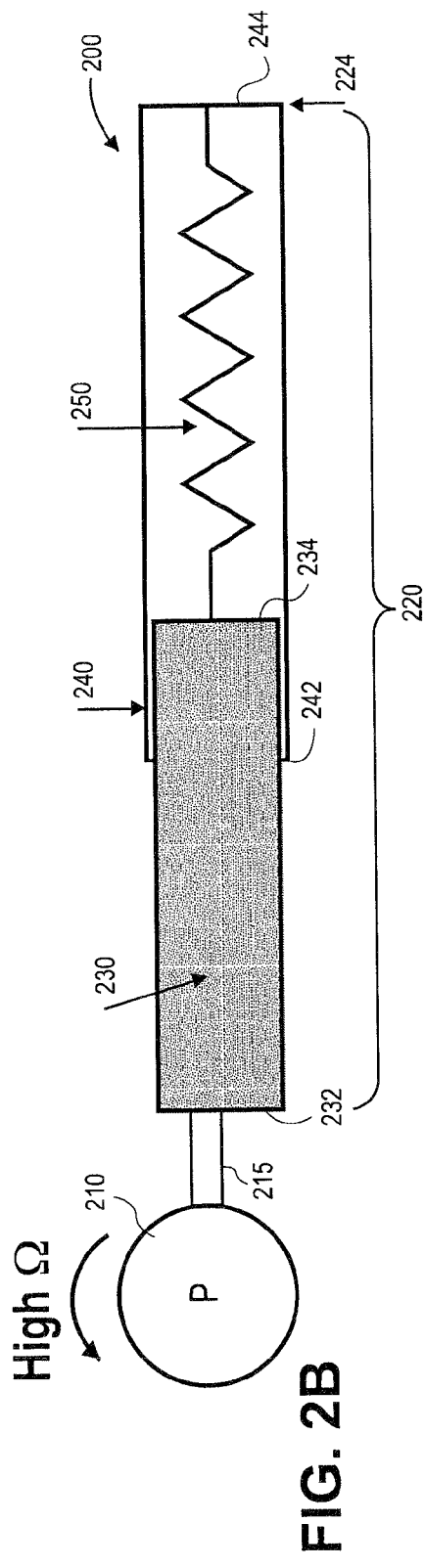

FIGS. 2A and 2B are top views depicting exemplary schematic and conceptual diagrams of a variable length rotor assembly 200 according to certain embodiments. It should be readily apparent to those skilled in the art that FIGS. 2A and 2B are exemplary and that other elements can be added, removed or modified without departing from the scope of the exemplary embodiments. It will be appreciated that FIGS. 2A and 2B are provided to depict the general concept of the present invention, and that certain examples for implementing the concept will be illustrated in subsequent figures.

As depicted, the exemplary rotor assembly 200 can be incorporated into a helicopter rotor and include various components. The rotor assembly 200 can include a rotor hub 210, a variable length rotor blade 220, a connector 215, and a restrictive force device 250 in connection with the variable length rotor blade 220. While FIG. 2 depicts several components of the rotor assembly 200, one skilled in the art will realize that the rotor assembly 200 can include any number and type of components.

The rotor hub 210 can be formed of a material, using any process, to any dimension and specification, as known in the art. For example, the rotor hub 210 can be formed of a metal and include a drive shaft or the like to impart rotation to the rotor hub 210. As depicted, the rotor hub 210 can be driven to rotate at a rotational speed $\Omega$. The rotational speed can vary according to desired flight requirements of a helicopter. For purposes of explanation, the rotational speed can be low (FIG. 2A) and the rotational speed can be high (FIG. 2B). It will be appreciated that the described low and high rotational speeds are relative and exemplary, and that true rotational speeds can be device specific.

The connector 215 can connect the variable length rotor blade 220 to the rotor hub 210. The connector 215 can be formed of a material, using any process, to any dimension and specification as known in the art. For example, the connector 215 can be rigid. Further, the connector 215 can be a flexure type connector.

The variable length rotor blade 220 can include an inner fixed blade section 230, an outer sliding blade section 240, and the restrictive force device 250 (such as a spring) interconnecting the inner fixed blade section 230 with the outer sliding blade section 240. The inner blade section 230 can be considered "fixed" in that it can be stationary relative to the rotor hub 210. Because of at least the restrictive force device, the outer blade section 240 can be linearly adjustable relative to the inner blade section 230. By linearly adjusting the outer blade section 240 relative to the inner fixed blade section 230, the span (overall length) of the rotor blade 220 can be adjusted. In certain embodiments, the rotor blade 220 can have a non-extended (e.g. stowed) length of 222 as depicted in FIG. 2A. In certain embodiments, the rotor blade 220 can have an extended length 224 as depicted in FIG. 2B.

The inner fixed blade section 230 can include an inner end 232 directed toward the rotor hub 210 and an outer end 234 directed away from the rotor hub 210. The inner end 232 of the inner fixed blade section 230 can be attached to the connector 215. Attachment to the connector 215 can be by any suitable connection as known in the art. Attachment to the connector 215 can be adjacent or proximate the inner end 232 of the inner fixed blade section 220. For example, the connector 215 and inner fixed rotor blade section 230 can be integrally or otherwise formed. Further, the connector 215 can be attached or otherwise fixed to the inner fixed rotor blade 230. The inner fixed blade section 230 can be connected to the restrictive force device 250. By way of a non-limiting example, the outer end 234 of the fixed blade section 230 can be connected to one end of the restrictive force device 250. Likewise, the restrictive force device 250 can be connected proximate the outer end 234 of the inner fixed blade section 230.

The outer blade section 240 can include an inner end 242 and an outer end 244. The outer end 244 can correspond to a "tip" of the rotor blade 220. The outer blade section 240 can be connected to the restrictive force device 250. By way of a non-limiting example, a remaining end of the restrictive force device 250 can be connected to the outer end 244 of the outer blade section 240. In certain embodiments, the inner end 242 of the outer blade section 240 can telescopically slide over the inner fixed blade section 230. In certain embodiments, the inner end 242 of the outer blade section 240 can telescopically slide within inner fixed blade section 230.

In FIG. 2A, the rotor blade 220 is shown in a partially extended position and in a more extended position in FIG. 2B. As depicted, restrictive force device 250 can define a relative position of the outer blade section 240 to the inner fixed blade section 230 in response to a force applied to the rotor blade 220, and more particularly to a force applied to the outer blade section 240 of the rotor blade 220.

Rotation of the rotor hub 210 from an internal power source (P) will generate centrifugal force in the rotor blade 220. As centrifugal force increases, so does a length of the rotor blade 220 due to an outward pull on the restrictive force device 250 by the outer rotor blade section 240 relative to the inner fixed blade section 230. As centrifugal force decreases, so does the length (span) of the rotor blade 220 due to normal bias of the restrictive force device 250 on the outer rotor blade section 240 toward the inner fixed blade section 230 in a direction of the rotor hub 210. Unlike previous known designs, the exemplary embodiments do not rely on operation of gears and the like to power the extension and retraction of the variable diameter rotor blade. Instead, centrifugal force directly correlates to blade span in proportion to rotational speed generated at the rotor hub 210. It will be appreciated that power P generated in the rotor hub 210 can be as a result of a motor, gears, etc. formed at or operationally connected to the hub 210, as known in the helicopter art.

With the centrifugal force actuated variable span rotor, a rotor span can be largest in, for example hover mode, and can automatically decrease as the rotor RPM is reduced in, for example, a high speed cruise situation (especially for a compound or coaxial configuration). The reduced rotor span can be used in a high speed cruise and in turn result in lower rotor drag and potentially improved gust-response and aero-elastic stability characteristics.

Figure 3A:
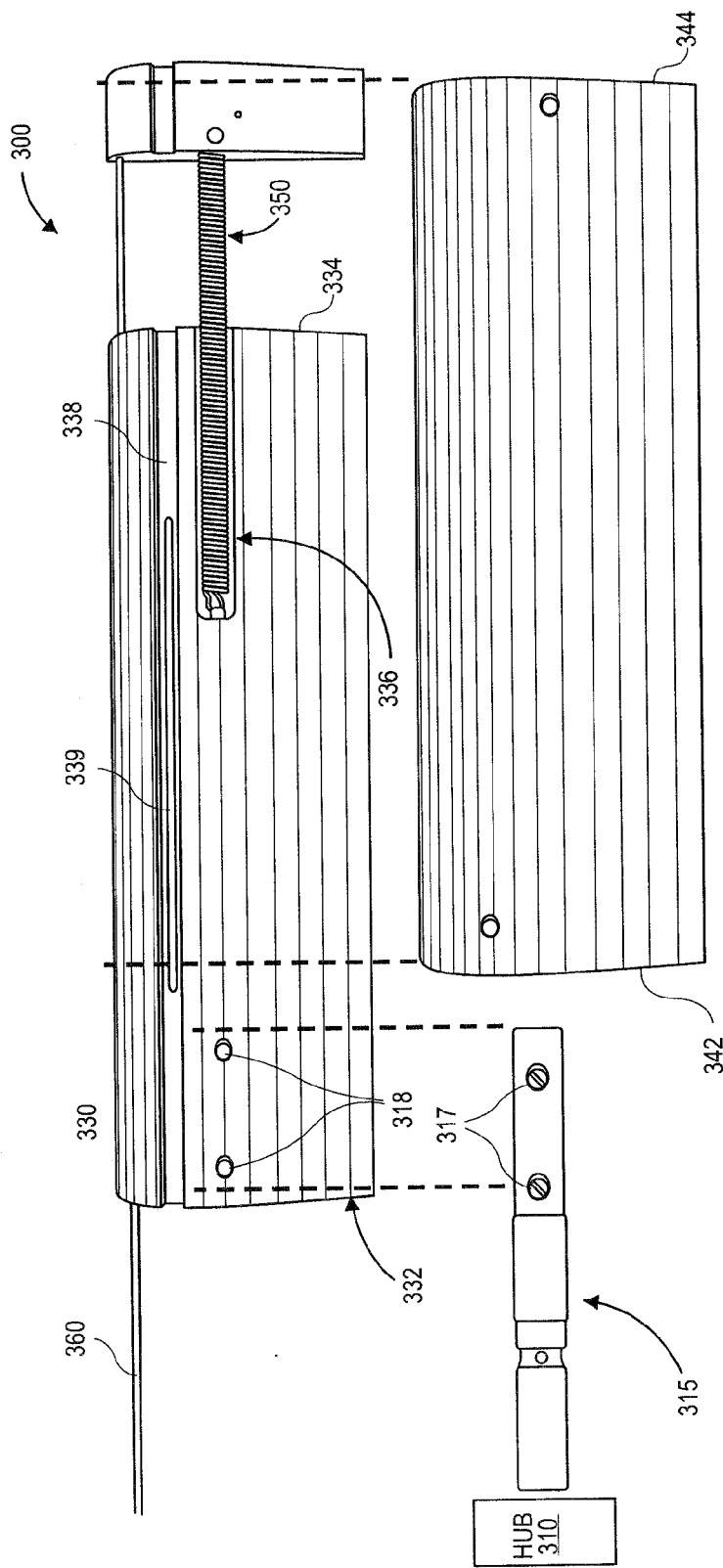
FIGS. 3A and 3B are top plan views of a variable length rotor blade according to certain embodiments with the rotor blade disassembled and assembled, respectively.
Figure 3B:
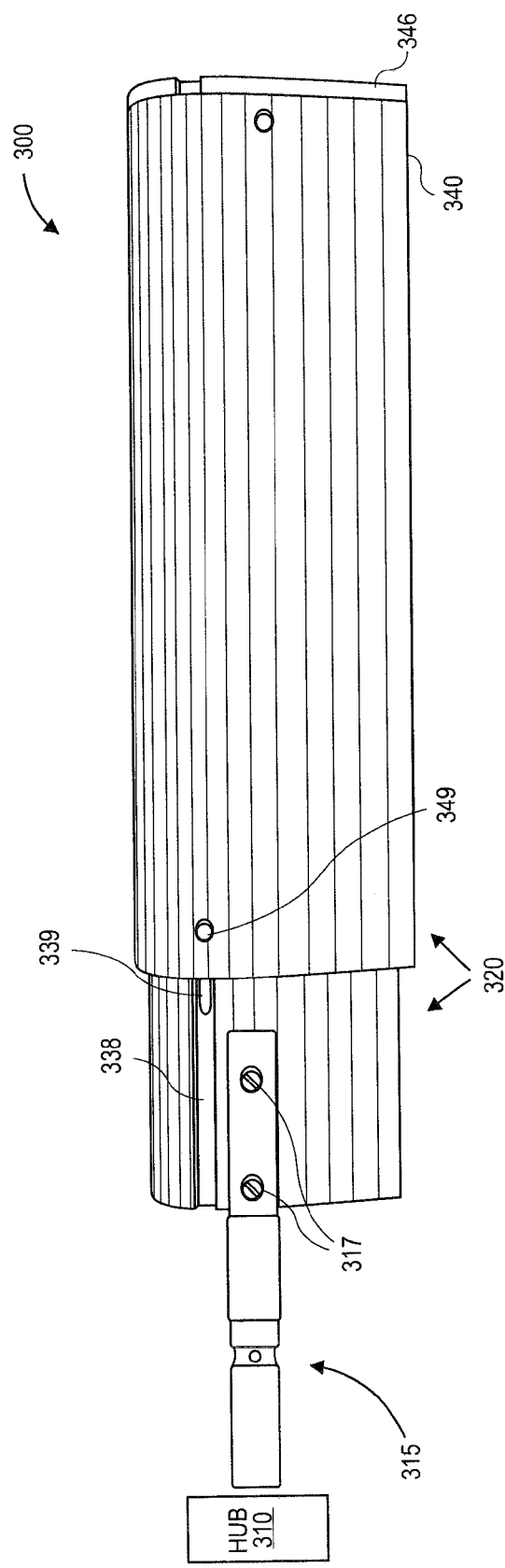
Figure 3C:
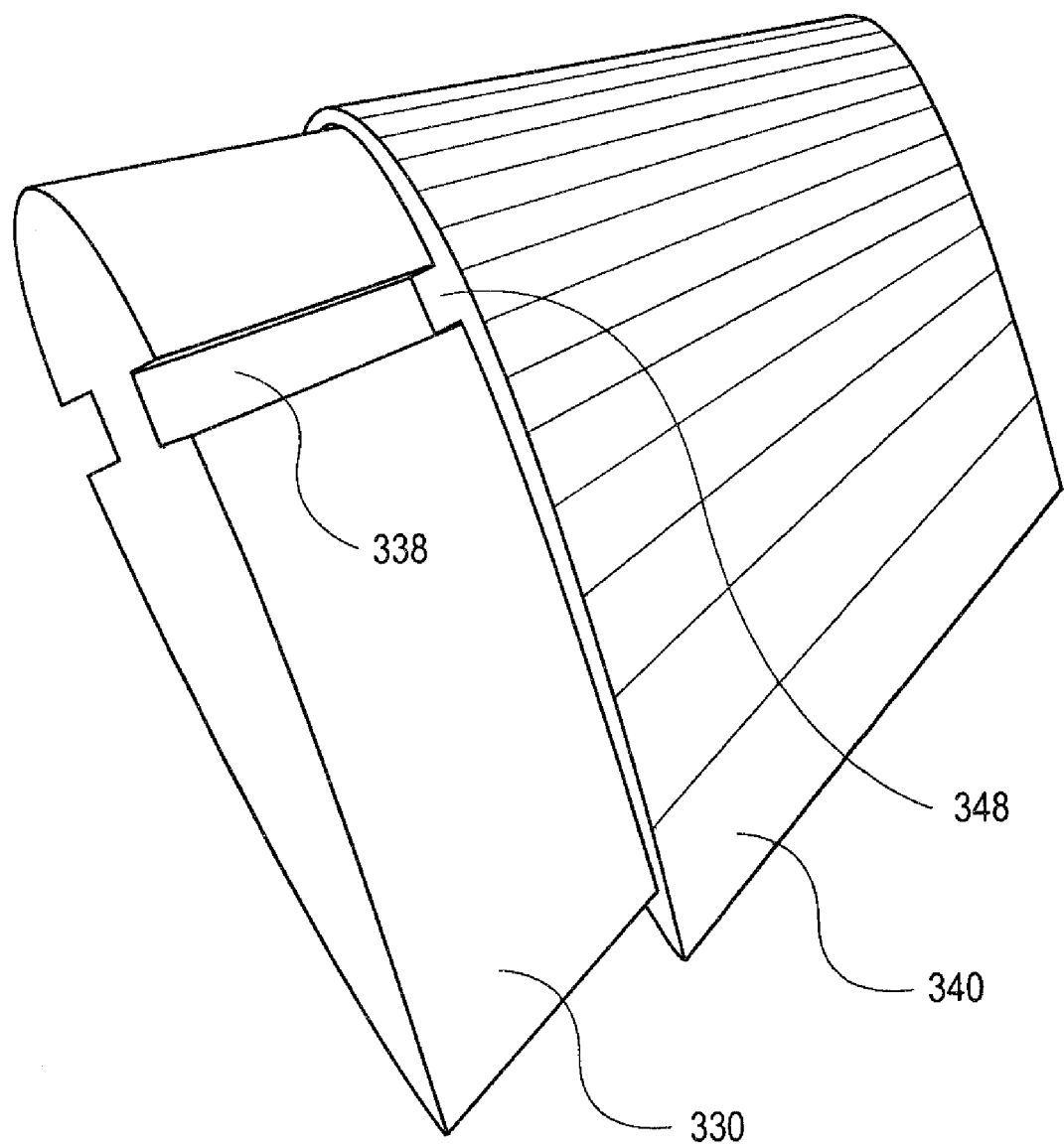
FIG. 3C is an end perspective view depicting exemplary detail of a variable length rotor assembly according to certain embodiments.

FIGS. 3A and 3B are top plan views and FIG. 3C is an end perspective view depicting an exemplary unassembled and assembled, respectively, schematic diagram of a variable length rotor assembly 300 according to certain embodiments. It should be readily apparent to those skilled in the art that FIGS. 3A, 3B and 3C are exemplary and that other elements can be added, removed or modified without departing from the scope of the exemplary embodiments. It will be appreciated that FIGS. 3A, 3B, and 3C incorporate the conceptual function of the exemplary embodiment of FIGS. 2A and 2B, with depiction of additional exemplary detail.

As depicted, the exemplary rotor assembly 300 can be integrated into a helicopter rotor and include various components. The rotor assembly 300 can include a rotor hub 310, a variable length rotor blade 320, a connector 315, and a restrictive force device 350 in connection with the variable length rotor blade 320. While FIGS. 3A, 3B, and 3C depict several components of the rotor assembly 300, one skilled in the art will realize that the rotor assembly 300 can include any number and type of components.

The rotor hub 310 can be formed of a material, using any process, to any dimension and specification, as known in the art. For example, the rotor hub 310 can be formed of a metal and include a drive shaft or the like to impart rotation to the rotor hub 310. As described in connection with FIGS. 2A and 2B, the rotor hub 310 can be driven to rotate at a rotational speed $\Omega$. The rotational speed can vary according to desired flight requirements of a helicopter.

The connector 315 connects the variable length rotor blade 320 to the rotor hub 310. The connector 315 can be formed of a material, using any process, to any dimension and specification as known in the art. For example, the connector 315 can be rigid. Further, the connector 315 can be a flexure type connector.

The variable length rotor blade 320 can include an inner fixed blade section 330, an outer blade section 340, and the restrictive force device 350 interconnecting the inner fixed blade section 330 with the outer blade section 340. Because of at least the restrictive force device 350, the outer blade section 340 can be linearly adjustable relative to the inner fixed blade section 330. By linearly adjusting the outer blade section 340 relative to the inner fixed blade section 330, the linear span (overall length) of the rotor blade 320 can be adjusted.

The inner fixed blade section 330 can be fixed and include an inner end 332 directed toward the rotor hub 310 and an outer end 334 directed away from the rotor hub 310. The outer blade section 340 can include an inner end 342 and an outer end 344. The outer end 344 can correspond to a "tip" of the rotor blade 320. In certain embodiments, the inner end 342 of the outer blade section 340 can telescopically slide over the inner fixed blade section 330. In certain embodiments, the inner end 342 of the outer blade section 340 can telescopically slide within the inner fixed blade section 330.

The fixed blade section 330 can be attached to the connector 315. Further, the inner end 332 or a location proximate the inner end 332 of the blade section 330 can be attached to the connector 315. Attachment to the connector 315 can be by any suitable connection as known in the art. For example, the connector 315 and inner fixed rotor blade section 330 can be integrally or otherwise formed. Further, the connector 315 can be attached or otherwise fixed to the inner fixed rotor blade 330. For example, the connector 315 can be attached with bolts 317 proximate the inner end 332 of the inner fixed blade section 330 and through apertures 318 thereof.

The inner fixed blade section 330 can be connected to the restrictive force device 350. For example, one end of the restrictive force device 350 can be connected to the inner fixed blade section 330 at a position intermediate the inner 332 and outer 334 ends thereof. Connection of the restrictive force device 350 to the inner fixed blade section 330 can be determined according to a type of restrictive force device 350 being used. For example, tension, predetermined contraction, type of material, etc. can determine a location of attachment of one end the restrictive force device 350 to the inner fixed blade section 330. In addition, a cutout 336 can be formed in the inner fixed blade section 330 to accommodate at least a portion of the restrictive force device 350. The cutout 336 can substantially conform in dimension, depth, and length to the restrictive force device 350 such that housing of the restrictive force 350 device substantially avoids friction on any facing or sliding components. For example, the restrictive force device 350 can include a spring. Accordingly, the cutout 336 can be dimensioned to accommodate the spring.

The remaining end of the restrictive force device 350 can be connected to the outer blade section 340. Connection of the remaining end of the restrictive force device 350 can be to the outer end 344 of the outer blade section 340. For example the remaining end of the restrictive force device 350 can be connected interior of the outer end 344 of the outer blade section 340. Such a connection can be suitable in the case of the outer blade section 340 telescoping over the inner fixed blade section 330 as depicted in the figures, however it will be appreciated that the restrictive force device 350 can be otherwise positioned if the outer blade section 340 telescopes within the inner fixed blade section 330.

An exemplary outer blade section 340 can include an end cap 346, as shown. The end cap 346 can fit, by friction fit, threaded screw, bolt, rivet, or otherwise, at the outer end 344 of the outer blade section 340. In this exemplary embodiment, the remaining end of the restrictive force device 350 can be connected to the outer blade section 340 or to the end cap 346.

As will be clear to those of skill in the art, the components of a rotor blade according to exemplary embodiments can be constructed from various materials, including metal and composites. For example, components of a rotor blade can be constructed from aluminum or carbon fiber composites.

The restrictive force device 350 can include an elastically expansible material. For example, the restrictive force device can include a spring, biased spring, compressed spring, elastic member, etc. It will be appreciated that the premise for the restrictive force device 350 is such that it can be selectively lengthened in response to centrifugal force applied to the rotor blade 320, and which will return to its original length or non-stressed state in the absence of centrifugal force actuation. The restrictive force device 350 can be provided in a manner other than shown and redundant springs or other travel limiters can also be provided. Further, a damping element can be provided between the inner fixed blade section 330 and the outer blade section 340.

The restrictive force device 350 can define a relative position of the outer blade section 340 to the inner fixed blade section 330 in response to a centrifugal force applied to the rotor blade 320, and more particularly to a centrifugal force applied to the outer blade section 340 of the rotor blade 320.

Rotation of the rotor hub 310 from an internal power source (not shown) will generate centrifugal force in the rotor blade 320. As centrifugal force increases, so does the length of the rotor blade 320 due to an outward pull on the restrictive force device 350 by the outer blade section 340 relative to the inner fixed blade section 330. As centrifugal force decreases, so does the length (span) of the rotor blade 320 due to normal bias of the restrictive force device 350 on the outer rotor blade section 340 toward the inner fixed blade section 330 in a direction of the rotor hub 310. The linear span of the rotor blade 320 is, therefore, proportional to a rotational speed of the rotor hub 310 and only due to actuation by centrifugal force. It will be appreciated, however, that the type of restrictive force device 350 can be selected to define the intended proportion. For example, the linear span can be directly proportional to rotational speed of the rotor hub. Further, the linear span can be indirectly proportional to rotational speed of the rotor hub, according to a type of restrictive force device 350.

In addition, span of the rotor blade 320 can depend on other factors. More specifically, linear span of the rotor blade 320 can depend upon an initial position and mass of the outer blade section 340, the stiffness of the restrictive force device 350, including a maximum strain capability, and the RPM range of the rotor hub 310. In any event, and unlike previous known designs, the exemplary embodiments do not rely on operation of gears and the like to power the extension and retraction of the variable diameter rotor blade. Instead, centrifugal force correlates to blade span in proportion to rotational speed generated at the rotor hub 310 and a linear span of the rotor blade is therefore adjustable in response to an amount of centrifugal force generated in the rotor hub by a rotational speed of the rotor hub. In certain embodiments, linear span of the rotor blade is adjustable only in response to an amount of centrifugal force generated in the rotor blade by a rotational speed of the rotor hub. Apart from the relationship requiring that the rotor span is adjustable in response to an amount of centrifugal force, either prior to or subsequent to such an adjustment, a length of the rotor blade can be locked at an adjusted or non-adjusted length as will be further described. Locking at a predetermined length can decouple blade length from rotational speed of the rotor for operations outside of the centrifugal force adjusted blade span.

The rotor blade 320 can further include a guide mechanism integrating sliding of the outer blade section 340 relative to the inner fixed blade section 330. The guide mechanism can include a guide slot 338 formed in one of the inner fixed blade section 330 or outer blade section 340, and a guide rail 348 formed in the other of the inner fixed blade section 330 or the outer blade section 340. In operation, the guide rail 348 can slide within the guide slot 338, the slide corresponding to linear expansion and contraction of the rotor blade 320. The guide slot 338 and guide rail 348 can be formed in part of or an entirety of a length of the respective inner fixed blade section 330 or outer blade section 340. Further, multiple guide slots 338 and corresponding guide rails 348 can be included in a rotor blade 320. Further exemplary guide mechanism configurations will be described in connection with subsequent figures.

The rotor blade 320 can further include a span restrictor 339 defining inner and outer spans of the rotor blade 320. The span restrictor 339 can include an inset within the guide slot 338. The span restrictor 339 can be of a length shorter than a length of the guide slot 338, and the span restrictor 339 can be of a depth greater than a depth of a portion of the guide slot 338. The span restrictor 339 can be engaged by an opposed engagement member 349. The opposed engagement member 349 can be, for example, a set screw that extends inwardly from the outer blade section 340 and engages the span restrictor 339. The span restrictor 339 and engagement member 349 cooperate to define the shortest and longest lengths of the rotor blade 320 by limiting the travel of the outer blade section 340 relative to the inner fixed blade section 330. Further exemplary span restrictor configurations will be described in connection with subsequent figures.

An electrical connection 360 can be connected to the outer blade section 340. The electrical connection 360 can be further connected to linear potentiometers or the like to collect and disseminate information regarding a span of the variable span rotor blade 320.

The rotor blade 320 can further include a locking mechanism for fixing a linear span of the rotor blade 320. The locking mechanism can fix an adjusted linear span of the rotor blade 320 and the locking mechanism can fix a non-adjusted linear span of the rotor blade 320. A non-adjusted linear span is when the centrifugal force on the outer moving section is in equilibrium with that in the restrictive force device (such as a spring), so the locking mechanism prevents dynamic axial oscillations, but is not required to sustain a significant force imbalance. On the other hand, the outer moving section of the blade can be extended by way of the centrifugal force, then locked in place, and then the rotational speed of the rotor can be changed (effectively decoupling the rotational speed from the span). In this case, the "adjusted" linear span is one where the centrifugal force on the outer moving section of the blade is not in equilibrium with that in the restrictive force device (such as a spring), and the difference in these forces is compensated for by the locking mechanism. The locking mechanism can further lock the rotor blade in intermediate linear span positions. In operation, the locking mechanism can selectively engage each of the inner and outer blade sections 330, 340, at a desired rotor span. Engagement of the locking mechanism can be remote at the direction of a pilot, and can be automatic upon obtaining certain flight parameters.

In operation, the variable diameter helicopter rotor can be used by generating rotation of the rotor hub 310. Rotation can be at a speed required to effect lift or otherwise operate the helicopter as known in the art. The use further includes adjusting a linear span of the rotor blades 320 connected to the rotor hub 310 by an amount corresponding to an amount of centrifugal force generated in the rotor blades 320 by a rotational speed of the rotor hub 310. Adjusting the linear span can include varying a position of an outer blade section relative to an inner fixed blade section. A span length corresponds to an amount of centrifugal force generated in the outer rotor blade section by rotational speed of the rotor hub. Additional operations can include guiding a motion of the outer blade section relative to the inner fixed blade section, and restricting an outer span of the linearly adjustable rotor blade 320. Operations can further include locking the rotor blades at adjusted and non-adjusted linear spans. Upon locking, the rotor span adjustment can be decoupled from the rotational speed of the rotor hub. Exemplary locking mechanisms and configurations will be described in subsequent figures.

FIGS. 4A, 4B, 4C and 4D are exemplary schematic diagrams depicting expanded and stow states of an exemplary rotor blade assembly 400 with a discrete locking mechanism. It should be readily apparent to those skilled in the art that FIGS. 4A, 4B, 4C and 4D are exemplary and that other elements can be added, removed or modified without departing from the scope of the exemplary embodiments. It will further be appreciated that FIGS. 4A, 4B, 4C and 4D are provided to depict the general concept of the present invention, and that certain examples for implementing the concept will be understood from the above description in connection with FIGS. 3A through 3C.

Figure 4A:
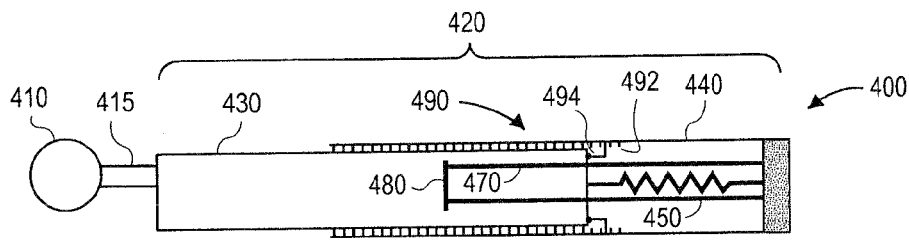
FIGS. 4A, 4B, 4C and 4D are schematic diagrams depicting expanded and stow states of an exemplary rotor blade assembly with a discrete locking mechanism according to certain embodiments.
Figure 4B:
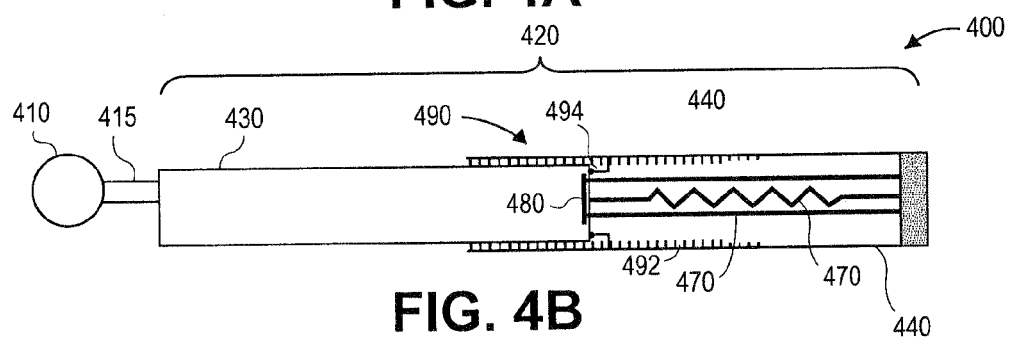
Figure 4C:
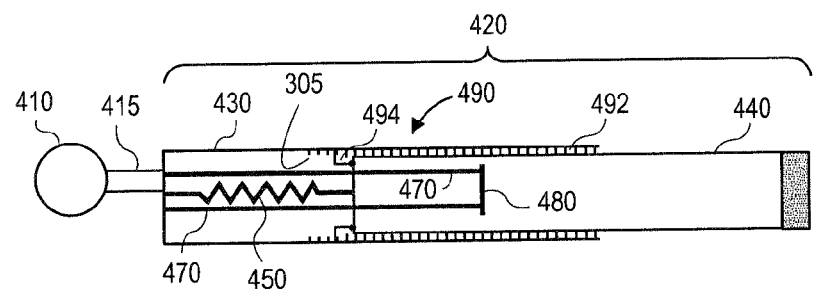
Figure 4D:
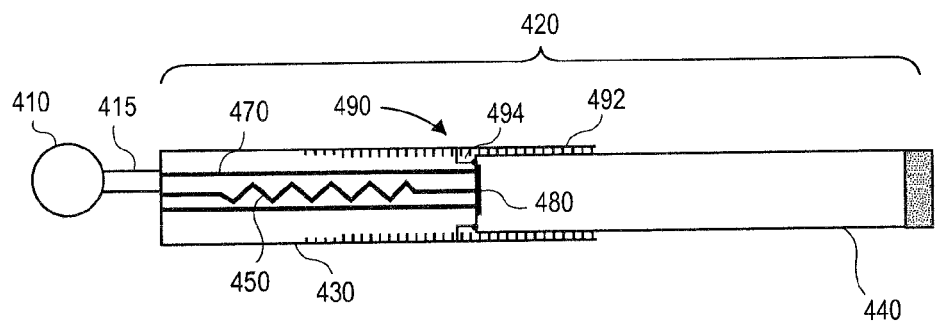

FIGS. 4A and 4B particularly depict an outer sleeve variable span rotor blade 420 in stow and expanded states, respectively, with a discrete locking mechanism 490. FIGS. 4C and 4D particularly depict an inner sleeve variable span rotor blade 420 in stow and expanded states, respectively, with a discrete locking mechanism 490.

In FIGS. 4A and 4B the variable diameter rotor blade 420 can include an inner fixed section 430 and an outer sliding sleeve section 440 of the rotor blade 420. The outer sliding sleeve section 440 can slide on the inner fixed section 430 of the rotor blade 420. FIGS. 4C and 4D are schematic representations of the variable diameter rotor blade 420 with outer sliding section 440 which slides into (e.g. within) the inner fixed section 430 of the blade 420. This embodiment can allow for a smaller chord sliding section as compared to the embodiment represented in FIGS. 4A and 4B.

In each of FIGS. 4A through 4D, at least two rotor blades 420 can be connected to a rotor hub 410 via a connector 415. The outer sleeve 440 can be guided via the use of guide devices 470. The guide devices 470 can include guide rails, guide rods or any other method that allows for a smooth sliding of the outer sleeve section 440 relative to the inner fixed section 430. It will be appreciated that the smooth sliding apparatus need not be limited to the confines of guide devices 470, but can also be distributed where there are two or more sliding surfaces present.

A stop device 480 can restrict the outer sleeve 440 to a maximum limit. Stop device 480 can act as a safety device to prevent over extension of the outer sleeve 440 relative to the inner fixed section 430. The sliding motion of the outer sleeve 440 can be restricted by a restrictive force device 450 which produces a restrictive force similar to that of a coiled spring. It should be noted that restrictive force device 450 can include both a spring force generation as well as a damping force, i.e. produce a force proportional to both the displacement of outer sleeve 440 as well as the sliding velocity of outer sleeve 440.

The locking mechanism assembly 490 can selectively restrict expansion of the rotor blade 420. The locking mechanism assembly 490 can include a toothed locking gear device 492 and a variable lock device 494. The locking mechanism assembly 490 can include a number of well-known devices such as linear gear teeth with a lock which wedges between these teeth to a Piezo-electric based or similar device which allows for the lock to be disengaged at the requirement of the user, i.e. the pilot or by a electronic computing device which controls the device based on previously defined control laws. In the embodiment shown in FIGS. 4A through 4D, the locking mechanism assembly 490 can be attached to the outer sliding sleeve section 440 and directly to the inner fixed section 430. This embodiment can restrict the motion of the sliding sleeve section 440 of the rotor blade 420. In this embodiment, the locking mechanism assembly 490 can be considered discrete.

It will be appreciated that the variable span rotor blade 420 can include multiple sliding sections, having one or more sleeve sliding sections as well as solid sliding sections in which case the discrete locking mechanism assembly 490 can still be applied.

FIGS. 5A, 5B, 5C and 5D are exemplary schematic diagrams depicting stow and expanded states of an exemplary rotor blade assembly 500 with an embedded locking mechanism 592/594. It should be readily apparent to those skilled in the art that FIGS. 5A, 5B, 5C and 5D are exemplary and that other elements can be added, removed or modified without departing from the scope of the exemplary embodiments. It will further be appreciated that FIGS. 5A, 5B, 5C and 5D are provided to depict the general concept of the present invention, and that certain examples for implementing the concept will be understood from the above description in connection with FIGS. 3A through 3C.

Figure 5A:
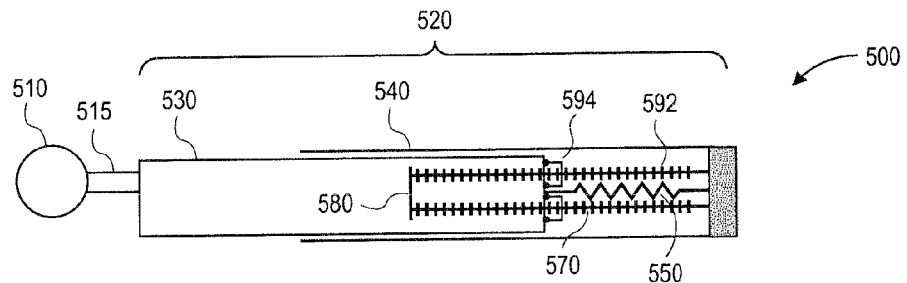
FIGS. 5A, 5B, 5C and 5D are schematic diagrams depicting expanded and stow states of an exemplary rotor blade assembly with an embedded locking mechanism according to certain embodiments.
Figure 5B:
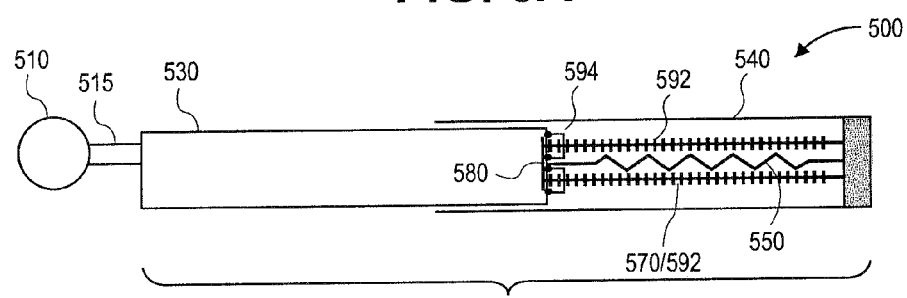
Figure 5C:
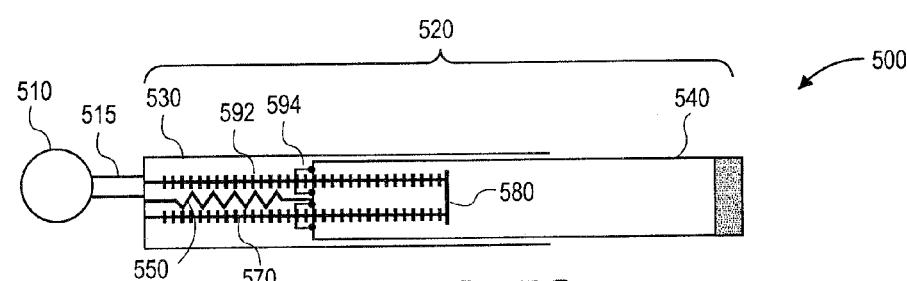
Figure 5D:
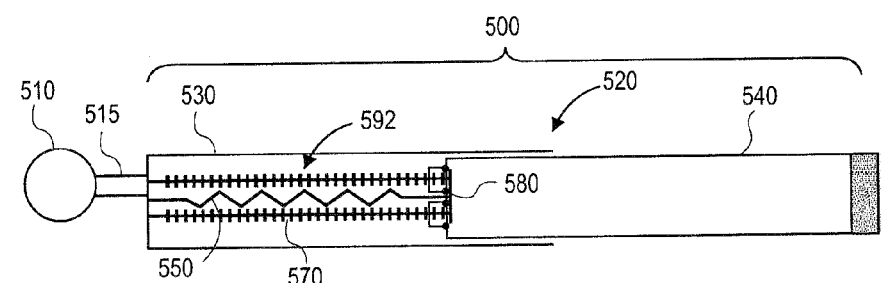

FIGS. 5A and 5B particularly depict an outer sleeve variable span rotor blade 520 in stow and expanded states, respectively, with the embedded locking mechanism. FIGS. 5C and 5D particularly depict an inner sleeve variable span rotor blade 520 in stow and expanded states, respectively with the embedded locking mechanism.

In FIGS. 5A and 5B, the variable span rotor blade 520 can include an inner fixed section 530 and an outer sliding sleeve section 540. The outer sliding sleeve section 540 can slide on the inner fixed section 530 of the rotor blade 520. FIGS. 5C and 5D are schematic representations of the variable diameter rotor blade 520 with an outer sliding section 540 which slides into (e.g. within) the inner fixed section 530 of the rotor blade 520. This embodiment can allow for a smaller chord sliding section as compared to the embodiment represented in FIGS. 5A and 5B.

In each of FIGS. 5A through 5D, at least two rotor blades 520 can be connected to a rotor hub 510 via a connector 515. The outer sleeve 540 can be guided via the use of guide devices 570. The guide devices 570 can include guide rails, guide rods or any other method that allows for a smooth sliding of the outer sleeve section 540 relative to the inner fixed section 530. It will be appreciated that the smooth sliding apparatus need not be limited to the confines of guide devices 570, but can also be distributed where there are two or more sliding surfaces present.

A stop device 580 can restrict the outer sleeve 540 to a maximum limit. Stop device 580 can act as a safety device to prevent over extension of the outer sleeve 540 relative to the inner fixed section 530. The sliding motion of the outer sleeve 540 can be restricted by a restrictive force device 550 which produces a restrictive force similar to that of a coiled spring. The restrictive force device 550 can include both a spring force generation as well as a damping force, i.e. produce a force proportional to both the displacement of the outer sleeve as well as the sliding velocity of outer sleeve 540.

The locking mechanism assembly 592/594 can be embedded within the guide device 570 of the rotor blade 520. Specifically, a toothed locking gear type device 592 can be a part of the guide device 570. A variable lock 594 can be attached to the inner fixed section 530 or the outer sliding portion 540. The locking mechanism assembly can be directly attached to the either sliding sleeve section 540 or the inner fixed section 530. This embodiment allows for attachment of the locking mechanism assembly to the slide guide device 570 and the inner fixed section 530 or the outer sliding portion 540 of the variable span rotor blade 520. A resulting smaller footprint of all the internal devices of the variable span rotor blade 520 can therefore be achieved.

Figure 6A:
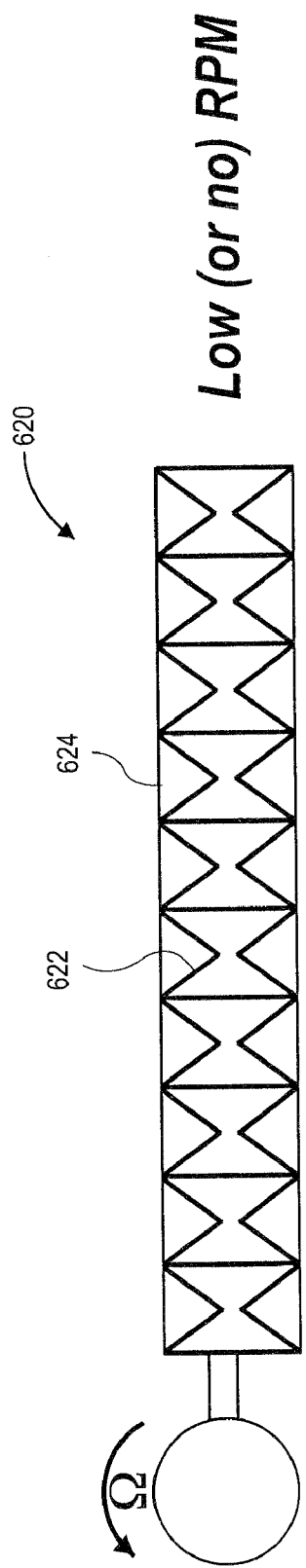
FIG. 6 depicts an exemplary alternative embodiment of a helicopter rotor blade according to certain embodiments, in two positions.
Figure 6B:
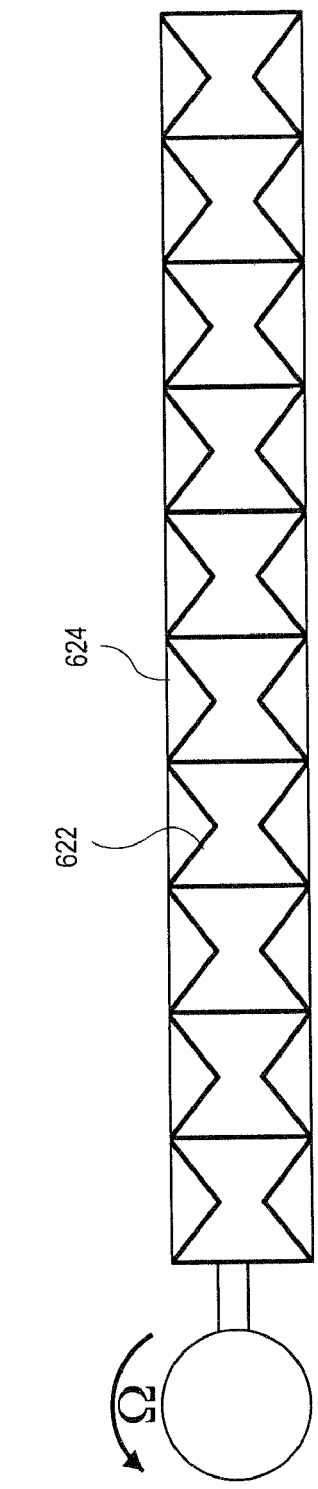

FIGS. 6A and 6B depict a variable diameter helicopter rotor blade 620 for a helicopter rotor according to certain embodiments. It should be readily apparent to those skilled in the art that FIGS. 6A and 6B are exemplary and that other elements can be added, removed or modified without departing from the scope of the exemplary embodiments.

In FIGS. 6A and 6B, the variable span rotor blade 620 can implement an extensible truss-like structure that assumes a configuration between a contracted or initial position as depicted in FIG. 6A, and an elongated position as depicted in FIG. 6B. The variable span rotor blade 620 can include a compliant truss-like structure 622 and a skin 624 formed over the compliant truss-like structure. This represents a continuum variable length blade embodiment as opposed to the sliding (telescoping) embodiment of FIGS. 2-5.

Figure 7:
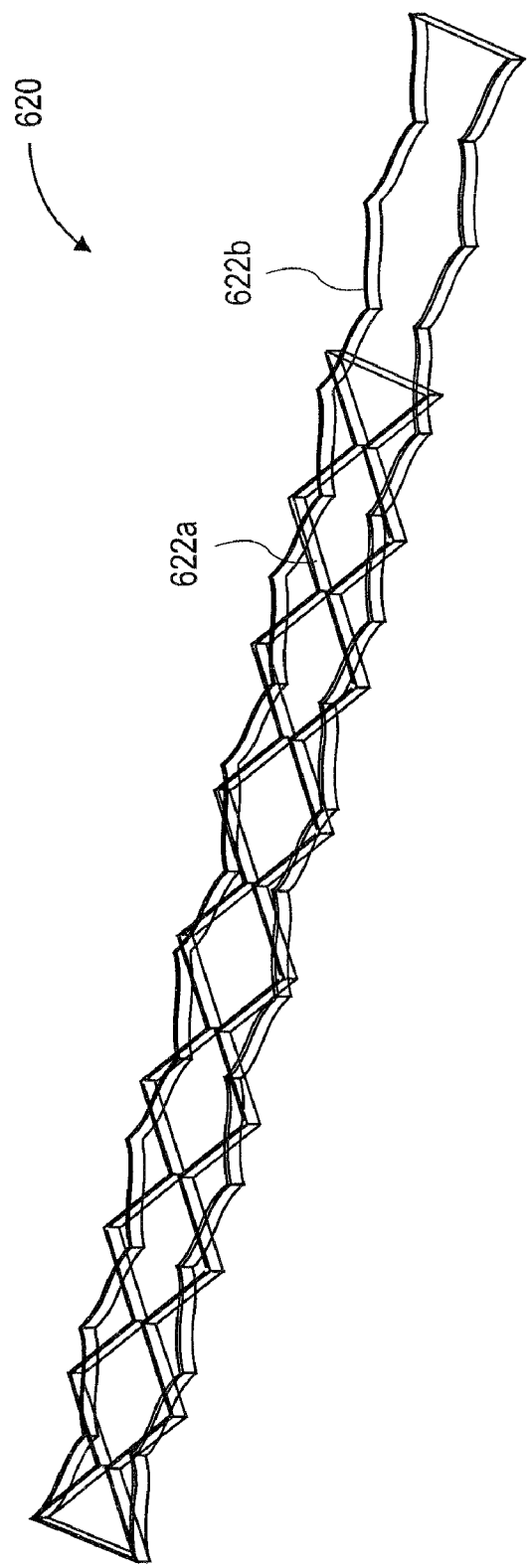
FIG. 7 depicts a perspective view of exemplary portions of the helicopter blade shown in FIG. 6.
Figure 8:
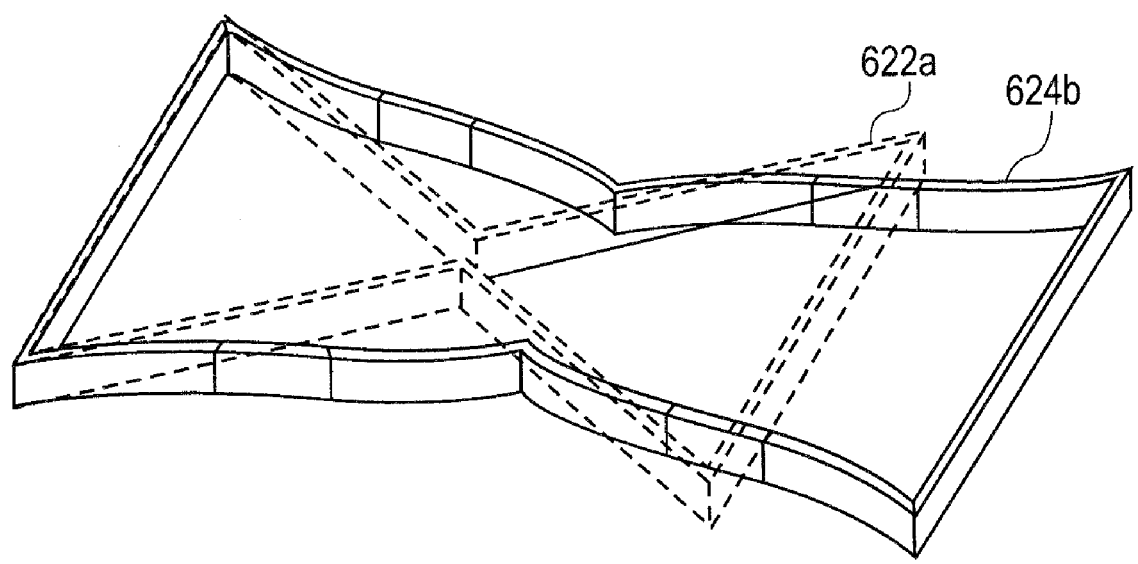
FIG. 8 depicts a perspective view of one exemplary "cell" of the embodiment shown in each of FIGS. 6 and 7.

As depicted in the details of FIG. 7 and FIG. 8, the compliant truss-like structure can include a plurality of interconnected cells that elongate and flex upon lengthening of the rotor blade 620, as between FIGS. 6A and 6B. Expansion and contraction can unfold and fold, e.g. expand and collapse, the interior cells of the truss structure. A collapsed truss-like structure can be seen at 622a, while an expanded truss-like structure can be seen at 622b. An exemplary truss cell is depicted in FIG. 8 in both contracted 622a and expanded 622b positions.

The skin 624 can be conformable to a size of the compliant truss structure 622. The skin 624 can be formed of deformable materials and can accommodate the linear expansion and contraction of the rotor blade 620. Some examples of deformable materials can include those of a cellular construction, and those having scales incorporated therein. In certain embodiments, the skin 624 can include an elastic material. In certain embodiments, the skin 624 can include an elastic composite material. For example, the skin 624 can include reinforced silicone.

Thus, the exemplary embodiments promote numerous technical advantages, including but not limited to improved maneuverability, longevity, manufacturability, and reliability. By way of example only, in the future, a tilt-rotor aircraft, like the V-22 Osprey, can increase rotor diameter for hovering and decrease it for flying in airplane mode. Shorter blades are stiffer and less susceptible to aero-elastic instabilities at low rotational speeds. Shorter blades can allow helicopters to take off and land on tighter pads (e.g. on ships and on rooftops) before they elongate for carrying heavy payloads.

While the invention has been described with reference to the exemplary embodiments thereof, those skilled in the art will be able to make various modifications to the described embodiments without departing from the true spirit and scope. The terms and descriptions used herein are set forth by way of illustration and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising". As used herein, the term "one or more of" with respect to a listing of items such as, for example, A and B, means A alone, B alone, or A and B.

Other embodiments of the present disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A variable diameter helicopter rotor comprising:
   a rotor hub operable by helicopter controls at variable revolutions per minute (RPM); and
   a linearly extensible rotor blade connected to the rotor hub comprising a restrictive force device, wherein a linear span of the rotor blade is arranged to adjust by the restrictive force device in response to an amount of centrifugal force generated in the rotor blade by a rotational speed of the rotor hub; and
   an operational rotor blade to effect at least lift of the helicopter.

2. The rotor of claim 1, the linearly extensible rotor blade comprising:
   an inner fixed section;
   an outer section telescopically slidable with respect to the inner fixed section; and
   the restrictive force device positioned between the inner fixed section and outer slidable section.

3. The rotor of claim 2, the restrictive force device comprising a spring.

4. The rotor of claim 2, the restrictive force device comprising an elastic member.

5. The rotor of claim 1, wherein the linear span is proportional to rotational speed of the rotor hub.

6. The rotor of claim 2, further comprising a guide mechanism integrating a slide of the outer section relative to the inner fixed section.

7. The rotor of claim 1, further comprising a span restrictor defining inner and outer span limits of the linearly adjustable rotor blade.

8. The rotor of claim 2, further comprising a span restrictor defining inner and outer span limits of the linearly adjustable rotor blade.

9. The rotor of claim 2, further comprising a housing containing the restrictive force device.

10. The rotor of claim 1, further comprising a locking mechanism for fixing a linear span of the linearly extensible rotor blade.

11. The rotor of claim 10, the locking mechanism decoupling a linear span of the rotor blade from rotational speed of the rotor hub.

12. The rotor of claim 10, the locking mechanism fixing an adjusted linear span.

13. The rotor of claim 10, the locking mechanism fixing a non-adjusted linear span.

14. The rotor of claim 2, further comprising a locking mechanism for fixing a linear span of the linearly extensible rotor blade, wherein the locking mechanism selectively engages each of the inner fixed section and outer section.

15. The rotor of claim 1, the linearly extensible rotor blade comprising an compliant morphing truss-like structure and an expansible skin formed over the truss-like structure.

16. The rotor of claim 1, the rotor comprising two or more rotor blades.

17. A method of using a variable diameter helicopter rotor, the method comprising:
generating rotation of a rotor hub; and
adjusting a linear span of rotor blades connected to the rotor hub using a restrictive force device by an amount corresponding to an amount of centrifugal force generated in the rotor blades by a rotational speed of the rotor hub, an operational rotor blade effecting at least lift of the helicopter.

18. The method of claim 17, wherein adjusting the linear span comprises varying a position of an outer blade section relative to a fixed inner blade section, a span length corresponding to an amount of centrifugal force generated in the outer rotor blade section by a rotational speed of the rotor hub.

19. The method of claim 17, wherein the linear span is proportional to rotational speed of the rotor hub.

20. The method of claim 18, further guiding a motion of the outer blade section relative to the fixed inner blade section.

21. The method of claim 17, further restricting an inner span and an outer span of the linearly adjustable rotor blade.

22. The method of claim 17, further locking the rotor blades at an adjusted linear span.

23. The method of claim 17, further locking the rotor blades at a non-adjusted linear span.

24. The method of claim 17, the rotor comprising two or more rotor blades.

* * * * *